United States Patent
Krueger et al.

(10) Patent No.: US 9,918,359 B2
(45) Date of Patent: Mar. 13, 2018

(54) DEVICE AND METHOD FOR REDUCING NETWORK REACTIONS WHEN AN ELECTRIC ARC FURNACE IS IN OPERATION

(71) Applicant: Maschinenfabrik Reinhausen GmbH, Regensburg (DE)

(72) Inventors: Klaus Krueger, Saaldorf-Surheim (DE); Dieter Dohnal, Lappersdorf (DE); Karsten Viereck, Regensburg (DE); Alexei Babizki, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 16 days.

(21) Appl. No.: 14/428,594

(22) PCT Filed: Oct. 9, 2013

(86) PCT No.: PCT/EP2013/071036
§ 371 (c)(1),
(2) Date: Mar. 16, 2015

(87) PCT Pub. No.: WO2014/060258
PCT Pub. Date: Apr. 24, 2014

(65) Prior Publication Data
US 2015/0215997 A1    Jul. 30, 2015

(30) Foreign Application Priority Data

Oct. 16, 2012   (DE) ........................ 10 2012 109 848

(51) Int. Cl.
*H05B 7/148*    (2006.01)
*H05B 7/144*    (2006.01)

(52) U.S. Cl.
CPC ............. *H05B 7/148* (2013.01); *H05B 7/144* (2013.01); *Y02P 10/256* (2015.11); *Y02P 10/259* (2015.11)

(58) Field of Classification Search
CPC ....... H05B 7/144; H05B 7/148; Y02P 10/256; Y02P 10/259; F27D 19/00; F27D 2019/0037

(Continued)

(56) References Cited

U.S. PATENT DOCUMENTS 4,463,432 A * 7/1984 Carter, II ................... H02J 3/14
                                                           307/35
4,514,218 A * 4/1985 Inagaki ................. C21C 5/5211
                                                          75/10.12

(Continued)

FOREIGN PATENT DOCUMENTS

CA    CA 2825987 A1 * 8/2012 .............. H02M 5/12
DE      2742221 A      3/1979

*Primary Examiner* — Hung D Nguyen
(74) *Attorney, Agent, or Firm* — Andrew Wilford

(57) ABSTRACT

Disclosed is a device and method for reducing network feedback during operation of an electric-arc furnace (10). The electric-arc furnace (10) has three lines (7) with one electrode (4) each. A sensor (15) for measuring the currently flowing current and a sensor (16) for measuring the currently applied voltage are provided in each line. A control and regulating unit (30) calculates an electrical actual value ($E_{ist1}$, $E_{ist2}$, $E_{ist3}$). A semiconductor tap changer (20) is assigned to the furnace transformer (6) such that, by suitably selecting three target winding taps ($T_{SOLL1}$, $T_{SOLL2}$, $T_{SOLL3}$) of a primary side (P) of the furnace transformer (6), a target current ($I_{S1}$, $I_{S2}$, $I_{S3}$) is adjustable in each line (7).

4 Claims, 2 Drawing Sheets

(58) Field of Classification Search
USPC .................. 373/102–105, 108, 147–150
See application file for complete search history.

(56) References Cited

U.S. PATENT DOCUMENTS

| | | |
|---|---|---|
| 4,683,577 A | 7/1987 | Bretthauer |
| 4,689,800 A | 8/1987 | Hanada |
| 6,603,795 B2 | 8/2003 | Ma |
| 8,624,565 B2 | 1/2014 | Brueckl |
| 8,817,840 B2 | 8/2014 | Wallmeier |
| 2008/0063024 A1* | 3/2008 | Pasch .................. H05B 7/148 |
| | | 373/105 |
| 2012/0183010 A1 | 7/2012 | Dittmer |
| 2012/0320942 A1 | 12/2012 | Dittmer |

* cited by examiner

DEVICE AND METHOD FOR REDUCING NETWORK REACTIONS WHEN AN ELECTRIC ARC FURNACE IS IN OPERATION

CROSS REFERENCE TO RELATED APPLICATIONS

This application is the US-national stage of PCT application PCT/EP2013/071036 filed 9 Oct. 2013 and claiming the priority of German patent application 102012109848.4 itself filed 16 Oct. 2012.

FIELD OF THE INVENTION

The invention relates to a device for reducing network feedback during operation of an electric-arc furnace. The electric-arc furnace has three lines each with one electrode and one respective phase conductor for electrical energy supply. A sensor for measuring the currently flowing current and a sensor for measuring the currently applied voltage are provided in each line. A control and regulating unit calculates a characteristic electrical actual value for each line from the time course of current and voltage.

The invention further relates to a method for reducing network feedback during operation of an electric-arc furnace.

BACKGROUND OF THE INVENTION

The German patent specification DE 35 12 189 [U.S. Pat. No. 4,683,577] discloses a method and a device for regulating electric-arc furnaces. The purpose is to enable precision adjustment of the electric arc voltage and the electrode height in a manner that is economical and technically feasible without great effort. The actuator for transformer voltage is always controlled by a power regulation. The power regulator superimposed on the current regulator also provides the reference variable for the current regulator. In all cases, only the current regulator acts directly on the electrode adjustment. For the tap changer drive used for the transformer, this therefore results in the possibility to either feed the transformer voltage directly via a set-point specification or to adjust it via the tap changer by means of the mentioned power regulator. The lift drive is actuated via a current regulator, with the respective control voltage being supplied either from a current regulator or from a wear regulator or directly as a specified target value.

The European patent application EP 2 362 710 [US 2012/0320942] discloses an electric-arc furnace and a method for operating an electric-arc furnace. The electric arc assigned to the at least one electrode has a first radiant power that results on the basis of a first adjusted set of operating parameters. The electric-arc furnace is operated according to a specified operation program that is based on an expected process sequence. Monitoring is conducted as to whether there is an undesired deviation between the actual process sequence and the expected process sequence. If there is a deviation, a modified second radiant power is specified. By means of the second radiant power, a modified second set of operating parameters is determined. The method allows to achieve an as short as possible smelting duration while protecting the operating means, in particular the electric-arc furnace cooling system.

The German patent application DE 35 43 773 [U.S. Pat. No. 4,689,800] describes a method for operating an electric-arc furnace such that it is possible with fluctuating raw materials to smelt this material at a minimum value of the drawn electrical energy consumption. The furnace transformer is provided with a load switch, thus making it possible to adjust the output voltage at the secondary side of the transformer. The control is carried out by modifying the taps of the furnace transformer or by lifting and lowering the graphite electrodes by an electrode lifting device in order to change the length of the electric arc. At the same time, the electric current flowing from the secondary side of the furnace transformer to the arc electrode is measured.

The German patent application DE 10 2009 017 196 [U.S. Pat. No. 8,624,565] discloses a tap changer with semiconductor switching components for uninterrupted switching between fixed tap changer contacts that are electrically connected with winding taps of a tapped transformer. In this context, each of the fixed tap changer contacts is either directly connectable with a load dissipation or, during switchover, connectable via the interconnected semiconductor switching components. The load dissipation has fixed, divided dissipation contact pieces so that the semiconductor switching components are galvanically isolated from the transformer winding during stationary operation. There are, however, various disadvantages to tap changers with semiconductor switching components. The permanent application of operating voltage and the strain on the power electronics by lightning impulse voltage necessitate large isolation distances, which are not desirable.

The German patent application DE 27 42 221 discloses a method for preventing disruptive flicker occurrences during operation of electric-arc furnaces. The electrical energy is supplied via a transformer with tap changer control, with the flicker level being detected by a flicker-measuring device. In an evaluation device, the measuring results are processed to a signal that is compared with a specified set-point corresponding to the permissible flicker base. On exceeding the set-point over a specified time interval, a downstream control device delivers a control impulse for switching the on-load tap changer to a lower secondary voltage step. On falling below the lower set-point, the control device triggers a higher secondary voltage step.

As known from the prior art, the electrical components for controlling or regulating the operation of an electric-arc furnace are a furnace transformer, a choke coil, and an electrode support arm system. The energy supply for the alternating current electric-arc furnaces is carried out via furnace transformers with an integrated tap changer. The corresponding energy input can be adjusted by the transformer stages.

A choke coil, which is switchable under load and connected upstream of the transformer, serves for regulating the reactance of the current circuit and thus enables operating the furnace with stable electric arcs as well as limiting the short circuit current. The suitable stage is selected both for the transformer and for the series-connected choke in dependence on process progress. This can be effected by manual intervention from the furnace operator, by an integrated control, or by regulation.

In manual control, an experienced furnace operator can assess the process state by the state of the melting material. This is a possibility for subjective observation of the furnace state and the smelting process. The transformer stage is adjusted in critical situations (for instance, damage to the refractory).

In automatic control, the transformer stages and the choke stages, as the case may be, are adapted depending on the present energy input. In order to maintain the electric arc as stable as possible, a high inductance is generally required in the initial "drilling phase" (OLTC choke=highest stage). The series-connected choke is switched off in the last phase "liquid bath" in order to reduce the reactive power.

A lower voltage step (short electric arcs) is selected during the drilling phase to protect the refractory lining of the furnace (the refractory) as well as the furnace lid. After the electric arc has been covered in foaming slag, the highest voltage step is selected to achieve the highest energy input into the melt. To ensure the high energy input during the final phase, a slightly lower step voltage is selected, while using the maximum current setting.

In particular in the manual and automatic control processes, the above mentioned specifications only very inadequately measure up to the actual process state. Even the newest regulations are also not able to react with the appropriate time constants (for example in the range of milliseconds) to the quick changes in the system.

With regard to tap changers in furnace transformers and choke coils and depending on the diverse switching strategies of the customers, the high switching frequencies are regarded as a technical stress factor. This is primarily attributed to contact erosion and to wear of the mechanical components in the tap changers.

Maintenance work on tap changers normally implies a high effort and, above all, cost-intensive production downtime, making it definitely desirable for the operator to extend the maintenance interval in order to reduce the maintenance effort for the tap changer as much as possible.

Furthermore, the frequent switching processes result in additional network feedback, for instance in the form of "flickering" that has to be reduced in a very elaborate and cost-intensive manner (for example SVC systems).

OBJECT OF THE INVENTION

The object of the invention is to create a device for reducing network feedback during operation of an electric-arc furnace, which device is cost-efficient and reliable and has a short reaction time for reducing or eliminating network feedback.

SUMMARY OF THE INVENTION

The object is solved by a device for reducing network feedback during operation of an electric-arc furnace in which a semiconductor tap changer is connected to the furnace transformer such that, by suitably selecting three target winding taps of a primary side of the furnace transformer and with a given electrical value, a target current can be set in each line.

A further object of the invention is to create a method for reducing network feedback during operation of an electric-arc furnace, which method is cost-efficient and reliable and has a short reaction time for reducing or eliminating network feedback.

The object is solved by a method for reducing network feedback during operation of an electric-arc furnace in which a current measurement and a voltage measurement for each of the phase conductors of a secondary side of a furnace transformer are carried out in each line;

a currently active electrical actual value is calculated for each line;

target phase voltages are calculated for each line in such a manner that, with a given electrical value, a target current can be adjusted for each line;

a winding tap, which is to be adjusted and which is on the primary side of the furnace transformer, is selected corresponding to the required target phase voltage; and a power regulation of the furnace transformer to the winding taps of the primary side, which are to be adjusted, is carried out by a semiconductor tap changer separately for all lines of the electric-arc furnace, wherein the semiconductor tap changer switches to the appropriate target position.

The device according to the invention for reducing network feedback during operation of an electric-arc furnace is characterized in that a semiconductor tap changer is assigned to the furnace transformer, wherein, by suitably selecting stages of a primary side of the furnace transformer, a target current is adjustable in each line with a specified electrical value.

Using the semiconductor tap changer, it is possible to switch to the target winding taps by corresponding and determined target positions of the semiconductor tap changer.

The method according to the invention is characterized in that:

a current measurement and a voltage measurement for each of the phase conductors of a secondary side of a furnace transformer are carried out in each line;

a currently active electrical actual value is calculated for each line;

target phase voltages are calculated for each line in such a manner that, with a given electrical value, a target current can be adjusted for each line;

the three winding taps of a primary side of the furnace transformer are selected in such a manner that the specified phase voltages are largely reached;

a winding tap, which is to be adjusted and which is on the primary side of the furnace transformer, is selected corresponding to the required target phase voltage; and in that a power regulation of the furnace transformer to the winding taps of the primary side, which are to be adjusted, is carried out by a semiconductor tap changer separately for all lines of the electric-arc furnace, wherein the semiconductor tap changer switches to the appropriate target position.

The winding tap to be adjusted results from the difference between a currently active winding tap on the primary side of the furnace transformer and the difference of the winding taps of the primary side of the furnace transformer.

The specification by a superordinate process control system with regard to a central position or an upper limit of the currently active winding tap of the transformer stage is taken into account.

A cycle time for adjusting the winding taps on the primary side of the furnace transformer by the semiconductor tap changer is in the range of 10 milliseconds.

The electrical actual value can be an impedance or an admittance, for instance.

During operation of an electric-arc furnace, various types of network feedback occur. The essential components of network feedback are the so-called flickers. It is possible to react immediately to the quick voltage fluctuations and thus to significantly reduce the flicker occurring during the process by a fast semiconductor tap changer (or solid state tap changer). Using a semiconductor tap changer can obviate additional circuitry and/or operating means, which would cause high costs for reducing the flicker during operation of an electric-arc furnace.

BRIEF DESCRIPTION OF THE DRAWING

These and other features and advantages of the various disclosed embodiments set forth here will be more fully understood with reference to the following description and the drawings, throughout which the same reference characters designate the same elements, and in which.

SPECIFIC DESCRIPTION OF THE INVENTION

Although the following description of the invention is made with regard to impedance as electrical value, this is not intended as a limitation of the invention.

Figure 1:
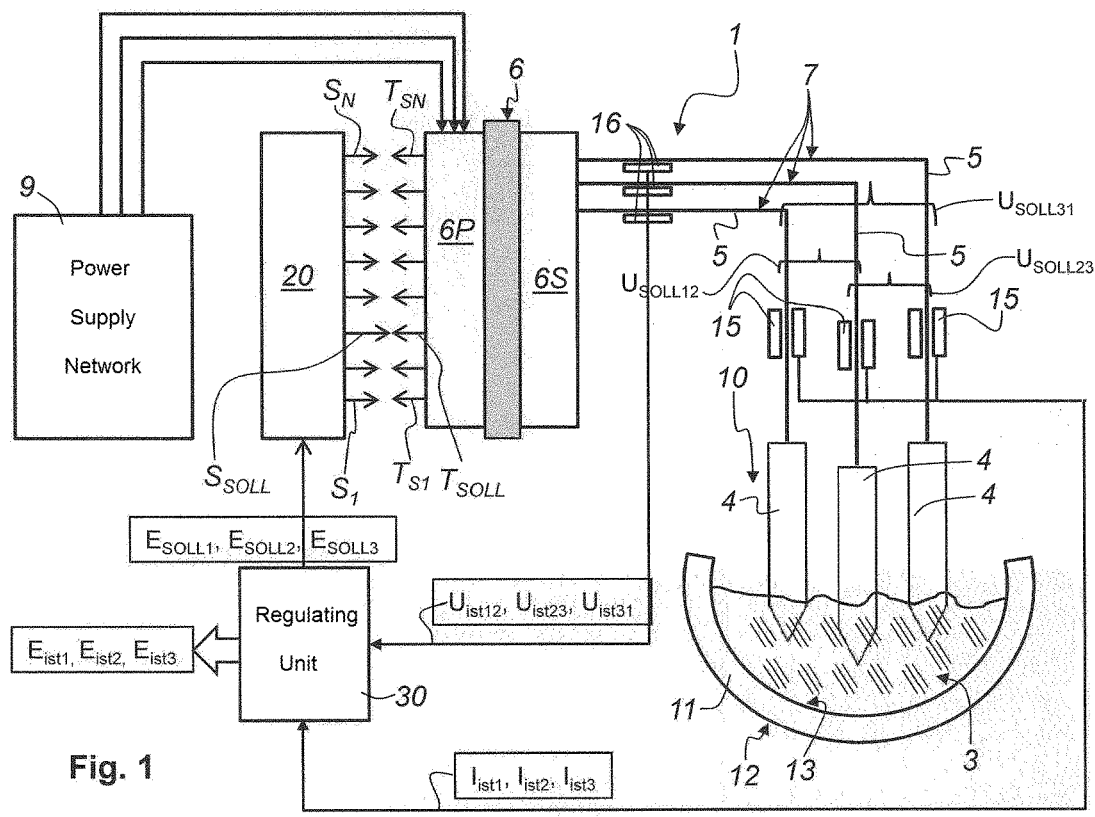
FIG. 1 is a schematic view of a system for smelting metal by an electric-arc furnace.

FIG. 1 shows a schematic presentation of a system 1 for smelting metal by an electric-arc furnace 10. The electric-arc furnace 10 is composed of a crucible 11 in which steel scrap is smelted and a melt 3 is produced. The crucible 11 can additionally be provided with a lid that is not illustrated. An outer wall surface 12 and lid of the crucible 11 are provided with a water cooling system. In dependence on the operating mode of the electric-arc furnace 10, the furnace has one or three electrodes 4. Three electrodes 4 are used in an alternating current electric-arc furnace 10. The following description illustrates the principle of the invention as exemplified by an alternating current electric-arc furnace. An unillustrated refractory material lines an inner wall surface 13 of the electric-arc furnace 10.

The electrodes 4 are arranged on a support arm that is not illustrated, and can be inserted into the crucible 11 as required. Each of the electrodes 4 is equipped with a phase conductor 5 connected with a secondary side 6S of a furnace transformer 6. Each phase conductor 5, the respective electrode 4, and the respective electric arc formed thereby thus form a phase or a line 7 of the alternating current circuit. A primary side 6P of the furnace transformer 6 is supplied with the required high voltage from a power supply network 9. An on-load tap changer 20 that is a semiconductor tap changer is connected with the primary side 6P of the furnace transformer 6.

A control and regulating unit 30 co-acts with the semiconductor tap changer 20 to switch winding taps $T_{S1} \ldots T_{SN}$ of the furnace transformer 6 on the primary side 6P in such a manner that corresponding phase voltages $U_{ist12}$, $U_{ist23}$, and $U_{ist31}$ are present, so that lines 7 are supplied with a corresponding target current $I_{S1}$, $I_{S2}$, and $I_{S3}$. As a result, a predetermined impedance $Z_{SOLL1}$, $Z_{SOLL2}$, and $Z_{SOLL3}$ will prevail in the lines 7. The primary side 6P of the furnace transformer 6 has the plurality of winding taps $T_{S1} \ldots T_{SN}$ that are switched by semiconductor switching components $S_1 \ldots S_N$ of the semiconductor tap changer 20. The control and regulating unit 30 receives input from a respective current sensor 15 and a respective voltage sensor 16 on each of the lines 7 of the electric-arc furnace 10. From the input data, the control and regulating unit 30 determines the switching sequence of the semiconductor tap changer 20 such that it switches to the corresponding target position $S_{SOLL1}$, $S_{SOLL2}$, and $S_{SOLL3}$ and thus effects the switching of the winding tap $T_{SOLL1}$, $T_{SOLL2}$, and $T_{SOLL3}$ that is to be adjusted and that is on the primary side 6P of the furnace transformer, so that the current is adjusted in the lines 7 or in a specific line 7.

Strong fluctuations of the current or of the voltage occur during the initial phase of the smelting process in the electric-arc furnace 10. The current fluctuations can be significantly reduced by the fast semiconductor tap changer 10 according to the invention.

Figure 2:
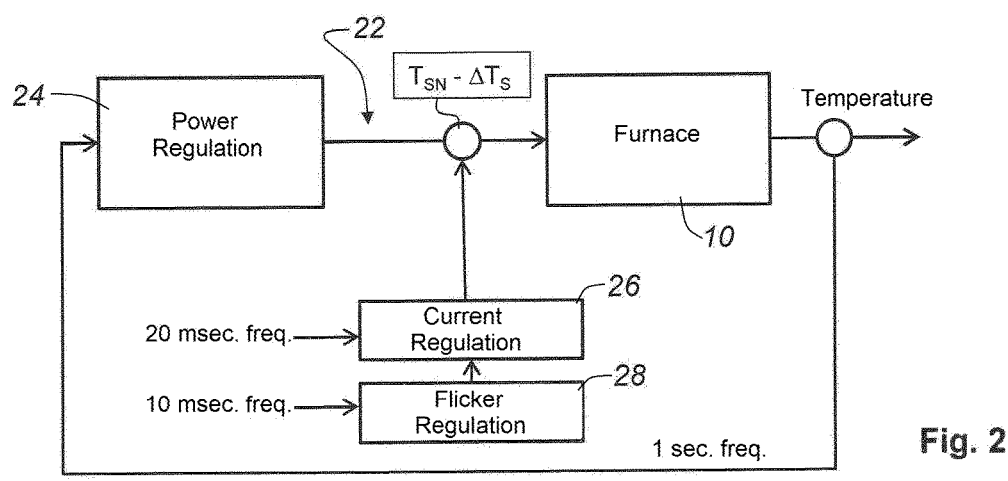
FIG. 2 is a schematic diagram of the integration of the regulation of an electric-arc furnace in the initial phase of the smelting process into the overall regulation of the electric-arc furnace.

FIG. 2 is a schematic diagram of the integration of a regulation of an electric-arc furnace 10 in the initial phase of a smelting process into the overall regulation 22 of the electric-arc furnace 10. The overall regulation of the electric-arc furnace 10 is ultimately realized via the semiconductor tap changer 20. A superordinate process control system 24 works at a frequency in the range of 1 second. Flicker regulation 28 works at a frequency in the range of 10 milliseconds. The frequency for each of the regulations corresponds to the repetition rate of the corresponding regulations. As a result of the measurements, it is possible by the semiconductor tap changer 20 to switch over to the appropriate winding tap $T_{S1} \ldots T_{SN}$ on a primary side 6P of the furnace transformer 6 for carrying out the required regulation of the electric-arc furnace 10 in such a manner that current fluctuations are minimized.

Figure 3:
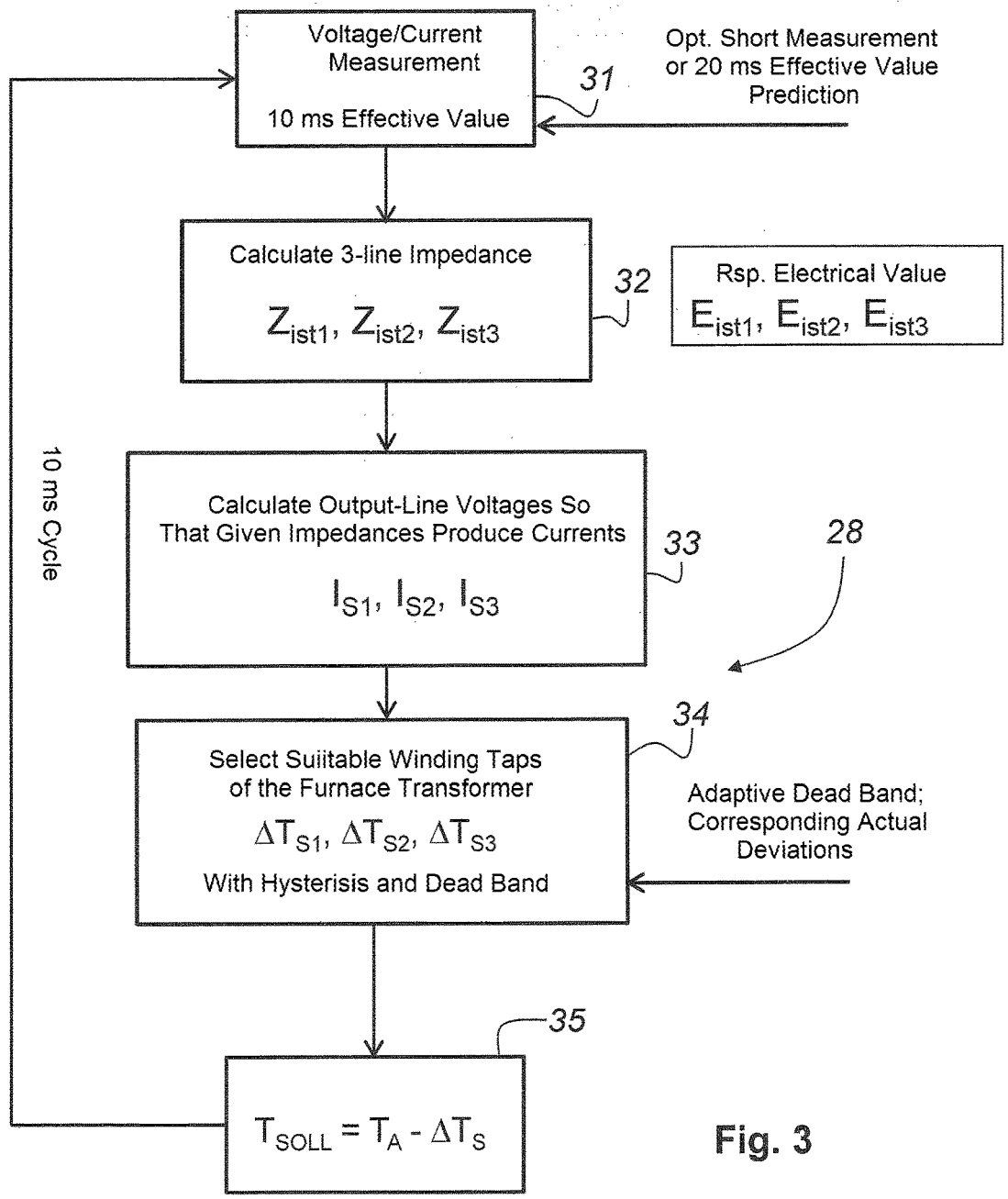
FIG. 3 is a flowchart of an electric-arc furnace regulation for reducing network feedback during operation of an electric-arc furnace.

FIG. 3 a flowchart of an electric-arc furnace 10 regulation for obviating or reducing network feedback during operation of the electric-arc furnace 10. In the first step 31, a current measurement and a voltage measurement are carried out for each of the phase conductors 5 that lead from a secondary side 6S of the furnace transformer 6 to the electrodes 4. The current measurement and the voltage measurement are thus carried out in each line 7.

In a second step 32, a currently active impedance $Z_{ist1}$, $Z_{ist2}$, and $Z_{ist3}$ is calculated for each line 7. In a subsequent step 33, three phase voltages $U_{ist12}$, $U_{ist23}$, and $U_{ist31}$ are calculated in such a manner that, with given present impedances $Z_{ist1}$, $Z_{ist2}$, $Z_{ist3}$ it is possible to adjust a target current $I_{S1}$, $I_{S2}$, $I_{S3}$ in each line 7. According to a fourth step 34, a difference in the winding taps $\Delta T_{S1}$, $\Delta T_{S2}$, and $\Delta T_{S3}$ of a primary side 6P of the furnace transformer 6 are selected in such a manner that fluctuations of the measured currents and voltages can only be taken into account outside a defined range of fluctuation. In a final step 35, the result for each line 7 is a winding tap $T_{SOLL1}$, $T_{SOLL2}$, $T_{SOLL3}$ that is to be adjusted and that is on the primary side 6P of the furnace transformer 6. In order to effect a reduction of the flicker in each line, the winding tap $T_{SOLL1}$, $T_{SOLL2}$, $T_{SOLL3}$ is calculated from a difference between a currently active stage $T_{A1}$, $T_{A2}$, and $T_{A3}$ on the primary side 6P of the furnace transformer 6 and the difference of the winding taps $\Delta T_{S1}$, $\Delta T_{S2}$, and $\Delta T_{S3}$ on the primary side 6P of the furnace transformer 6. The semiconductor tap changer 20 enables a quick adjustment of the required winding tap $T_{SOLL1}$, $T_{SOLL2}$, or $T_{SOLL3}$, thereby spanning several winding taps. The semiconductor tap changer 20 makes it possible to carry out the readjustment of the winding taps $T_{SOLL1}$, $T_{SOLL2}$, or $T_{SOLL3}$ that are to be adjusted and that are on the primary side 6P of the furnace transformer 6.

Only by using the semiconductor tap changer 20 is it possible to achieve a cycle time in the range of 10 milliseconds for adjusting the required winding tap $T_{SOLL1}$, $T_{SOLL2}$, and $T_{SOLL3}$ on the primary side 6P of the furnace transformer 8.

The invention was described with reference to two embodiments. Those skilled in the art will appreciate that changes and modifications of the invention can be made without departing from the scope of protection of the following claims.

The invention claimed is:

1. A method for reducing network feedback during operation of an electric-arc furnace, the method comprising the steps of:
   measuring a current and a voltage for each of the phase conductors of a secondary side of a furnace transformer are carried out in each line;
   calculating a currently active electrical actual value for each line;
   calculating target phase voltages for each line in such a manner that, with a given electrical value, a target current can be adjusted for each line;
   selecting a winding tap to be adjusted and on the primary side of the furnace transformer corresponding to the required target phase voltage;
   carrying out a power regulation of the furnace transformer to the winding taps of the primary side to be adjusted by a semiconductor tap changer separately for all lines of the electric-arc furnace and then switching the semiconductor tap changer to the appropriate target position;
   controlling power independently of adjustment of the target current with a cycle time for adjusting the winding taps by the semiconductor tap changer on the primary side of the furnace transformer in the range of 10 milliseconds.

2. The method according to claim 1 wherein the winding tap to be adjusted results from a difference between a currently active winding tap on the primary side of the furnace transformer and the difference of the winding taps of the primary side of the furnace transformer.

3. The method according to claim 2 wherein a central position or an upper limit of the currently active winding tap of the transformer stage is taken into account by a superordinate process control system.

4. The method according to claim 1, wherein the electrical actual value is an impedance or an admittance.

* * * * *